(12) United States Patent
Nagata et al.

(10) Patent No.: US 9,358,527 B2
(45) Date of Patent: Jun. 7, 2016

(54) EXHAUST GAS PURIFICATION CATALYST AND PRODUCTION METHOD THEREOF

(75) Inventors: Naoto Nagata, Toyota (JP); Hirohito Hirata, Toyota (JP); Kimiyasu Ono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/412,132

(22) PCT Filed: Jul. 9, 2012

(86) PCT No.: PCT/JP2012/067467
§ 371 (c)(1),
(2), (4) Date: Dec. 30, 2014

(87) PCT Pub. No.: WO2014/010012
PCT Pub. Date: Jan. 16, 2014

(65) Prior Publication Data
US 2015/0151282 A1    Jun. 4, 2015

(51) Int. Cl.
*B01J 21/00* (2006.01)
*B01J 21/04* (2006.01)
(Continued)

(52) U.S. Cl.
CPC ........... *B01J 23/8926* (2013.01); *B01D 53/945* (2013.01); *B01J 23/8913* (2013.01); *B01J 35/006* (2013.01); *B01J 35/0013* (2013.01); *B01J 35/026* (2013.01);
(Continued)

(58) Field of Classification Search
CPC ............ B01J 23/66; B01J 23/75; B01J 21/00; B01J 35/006

USPC ................. 502/243, 260, 327, 330, 332, 439; 977/773, 775
See application file for complete search history.

(56) References Cited

U.S. PATENT DOCUMENTS

| | | | | |
|---|---|---|---|---|
| 5,977,012 A | * | 11/1999 | Kharas | ................. B01D 53/945 502/325 |
| 7,238,472 B2 | * | 7/2007 | Mirkin | ............. A61K 47/48861 435/6.1 |

(Continued)

FOREIGN PATENT DOCUMENTS

| JP | 2001-524030 A | 11/2001 |
|---|---|---|
| JP | 2005-185959 A | 7/2005 |

(Continued)

OTHER PUBLICATIONS

Cheng, Guangjun et al. "Synthesis and characterization of cobalt/gold bimetallic nanoparticles," Journal of Magnetism and Magnetic Materials, vol. 311, No. 1, pp. 31-35, 2006.

(Continued)

*Primary Examiner* — Cam N. Nguyen
(74) *Attorney, Agent, or Firm* — Oliff PLC

(57) ABSTRACT

An exhaust gas purification catalyst of the present invention includes a catalyst support and a plurality of bimetallic particles supported thereon wherein the bimetallic particles consist of gold and cobalt and have an average particle size of greater than 0 nm but 100 nm or less. A method of the present invention includes heating a mixed solution containing a gold salt, a cobalt salt, a solvent and an inorganic reducing agent to a temperature sufficient to reduce gold and cobalt, thereby producing bimetallic particles consisting of gold and cobalt, and supporting the produced bimetallic particles on the catalyst support.

20 Claims, 8 Drawing Sheets

(51) Int. Cl.

| | | |
|---|---|---|
| *B01J 23/02* | (2006.01) | |
| *B01J 23/40* | (2006.01) | |
| *B01J 23/42* | (2006.01) | |
| *B01J 23/56* | (2006.01) | |
| *B01J 23/58* | (2006.01) | |
| *B01J 23/89* | (2006.01) | |
| *B01J 37/16* | (2006.01) | |
| *B22F 9/24* | (2006.01) | |
| *B01D 53/94* | (2006.01) | |
| *B01J 35/00* | (2006.01) | |
| *B22F 1/00* | (2006.01) | |
| *C22C 1/04* | (2006.01) | |
| *B82Y 30/00* | (2011.01) | |
| *B01J 35/02* | (2006.01) | |
| *B01J 37/00* | (2006.01) | |

(52) U.S. Cl.
CPC ............ *B01J 37/0018* (2013.01); *B01J 37/16* (2013.01); *B22F 1/0018* (2013.01); *B22F 9/24* (2013.01); *B82Y 30/00* (2013.01); *C22C 1/0433* (2013.01); *C22C 1/0466* (2013.01); *B01D 2255/106* (2013.01); *B01D 2255/20746* (2013.01); *B01D 2255/9202* (2013.01); *Y02T 10/22* (2013.01)

(56) References Cited

U.S. PATENT DOCUMENTS

| | | | | | |
|---|---|---|---|---|---|
| 7,381,682 | B1* | 6/2008 | Jia | ........................ | B01D 53/864 502/327 |
| 7,381,683 | B1* | 6/2008 | Wang | .................... | B01D 53/864 502/326 |
| 7,601,668 | B2* | 10/2009 | Zhou | ........................ | B01J 23/44 423/584 |
| 7,626,192 | B2* | 12/2009 | Hutchison | ........... | H01L 51/0595 257/9 |
| 7,629,291 | B2* | 12/2009 | Dai | ........................ | B01J 23/52 502/208 |
| 7,727,931 | B2* | 6/2010 | Brey | ........................ | A62D 9/00 423/23 |
| 7,754,639 | B2* | 7/2010 | Saito | .................. | B01D 53/9422 502/103 |
| 7,989,384 | B2* | 8/2011 | Brey | ........................ | A62D 9/00 423/427 |
| 8,178,463 | B2* | 5/2012 | Stamenkovic | ........ | H01M 4/921 420/466 |
| 8,257,670 | B1* | 9/2012 | Dakshinamurthy | ... | B82Y 30/00 423/23 |
| 8,383,014 | B2* | 2/2013 | Vanheusden | ............ | H01B 1/22 252/512 |
| 8,431,506 | B2* | 4/2013 | Neltner | .................... | B01J 23/10 502/240 |
| 8,618,020 | B2* | 12/2013 | Brey | ........................ | A62D 9/00 423/23 |
| 8,652,232 | B2* | 2/2014 | Bisson | .................... | B01J 23/40 502/339 |
| 8,668,848 | B2* | 3/2014 | Vanheusden | ............ | H01B 1/22 252/512 |
| 8,685,878 | B2* | 4/2014 | Stamenkovic | ........ | H01M 4/921 420/466 |
| 8,808,567 | B2* | 8/2014 | Mazyar | .................... | H01F 1/01 252/62.52 |
| 8,864,045 | B1* | 10/2014 | Jiang | ........................ | B05B 1/24 239/128 |
| 8,877,951 | B2* | 11/2014 | Wang | ........................ | B01J 31/08 549/498 |
| 8,883,308 | B2* | 11/2014 | Polshettiwar | ............ | B01J 23/02 423/335 |
| 9,029,286 | B2* | 5/2015 | Neltner | .................... | B01J 23/10 502/240 |
| 9,139,433 | B2* | 9/2015 | Addiego | ............... | B01D 53/864 |
| 2009/0165369 | A1* | 7/2009 | Luhrs | ........................ | C06D 5/06 44/500 |
| 2009/0192030 | A1* | 7/2009 | Myers | ........................ | B01J 23/89 502/184 |
| 2010/0009338 | A1* | 1/2010 | Zhang | .................... | B82Y 10/00 435/5 |
| 2010/0221159 | A1* | 9/2010 | Insley | .................. | B01D 53/864 422/211 |
| 2011/0033353 | A1* | 2/2011 | Siani | ........................ | B01D 53/944 423/213.5 |

FOREIGN PATENT DOCUMENTS

| | | |
|---|---|---|
| JP | 2006-043634 A | 2/2006 |
| JP | 2009-202127 A | 9/2009 |
| WO | 98/51401 A1 | 11/1998 |
| WO | 2005/063387 A1 | 7/2005 |
| WO | 2006/016249 A1 | 2/2006 |

OTHER PUBLICATIONS

Soulé, Jean-Francois et al. "Powerful Amide Synthesis from Alcohols and Amines under Aerobic Conditions Catalyzed by Gold or Gold/iron, -Nickel or -Cobalt Nanoparticles," Journal of the American Chemical Society, vol. 133, No. 46, pp. 18550-18553, 2011.

* cited by examiner

EXHAUST GAS PURIFICATION CATALYST AND PRODUCTION METHOD THEREOF

TECHNICAL FIELD

The present invention relates to an exhaust gas purification catalyst and a production method thereof. More specifically, the present invention relates to an exhaust gas purification catalyst comprising bimetallic particles consisting of gold and cobalt, and a production method thereof.

BACKGROUND ART

Harmful ingredients such as carbon monoxide (CO), hydrocarbon (HC) and nitrogen oxide (NOx) are contained in an exhaust gas discharged from an automotive internal combustion engine such as a gasoline engine and diesel engine. Therefore, an exhaust gas purification system for decomposing and removing these harmful ingredients is generally provided in a vehicle, and the harmful ingredients are made harmless by an exhaust gas purification catalyst arranged in the exhaust gas purification system. Conventionally, a three-way catalyst capable of simultaneously performing oxidation of CO and HC and reduction of NOx in the exhaust gas has been used as the exhaust gas purification catalyst. More specifically, a catalyst obtained by supporting a noble metal, in particular a platinum group element such as platinum (Pt), rhodium (Rh) and palladium (Pd) on a porous oxide support such as alumina ($Al_2O_3$) is widely known as a three-way catalyst.

However, such a platinum group element is a very expensive rare metal, because it is produced in a small area and the production is concentrated in specific areas such as South Africa and Russia. In addition, the platinum group element is being used in increasingly larger amounts along with toughening of automotive emission controls. For this reason, depletion of resources is becoming a concern. Therefore, it is required to reduce the amount of use of the platinum group element and, in the future, to replace the platinum group element in role with other metals, etc. Thus, many studies are being made on a catalyst component to reduce the amount of use of the platinum group element or substitute for the platinum group element.

Japanese Unexamined Patent Publication (Kokai) No. 2005-185959 describes an exhaust gas purification catalyst comprising at least one kind of noble metal A selected from Ru, Rh, Pd, Ag, Ir, Pt and Au; a transition metal compound B including at least one kind of transition metal element selected from Mn, Fe, Co, Ni, Cu and Zn; and a porous carrier carrying the noble metal A and the transition metal compound B, wherein the noble metal A partially or entirely forms a composite with the transition metal compound B. For example, Japanese Unexamined Patent Publication (Kokai) No. 2005-185959 specifically discloses a combination of Pt and Co as the composite of the noble metal A and the transition metal compound B. Furthermore, Japanese Unexamined Patent Publication (Kokai) No. 2005-185959 describes that according to the above exhaust gas purification catalyst, since the transition metal compound B develops catalytic activity, high catalytic activity can be maintained even if the amount of the expensive noble metal A is reduced.

Japanese Unexamined Patent Publication (Kokai) No. 2006-043634 describes an exhaust gas purification catalyst, comprising a noble metal; a transition metal compound partially or entirely forming a composite with the noble metal; a third component element coming into contact with the composite and having an electronegativity of 1.5 or less; and a porous support supporting the noble metal, the transition metal compound and the third component element and partially or entirely forming a composite oxide with the third component element. For example, Japanese Unexamined Patent Publication (Kokai) No. 2006-043634 specifically discloses a combination of Pt and Co as the composite of the noble metal and the transition metal compound. Furthermore, Japanese Unexamined Patent Publication (Kokai) No. 2006-043634 describes that according to the above exhaust gas purification catalyst, since the transition metal compound develops catalytic activity, it is possible to increase the catalytic activity of the exhaust gas purification catalyst while reducing the amount of noble metal used.

Japanese Unexamined Patent Publication (Kohyo) No. 2001-524030 describes a gold catalyst capable of simultaneously performing oxidation of carbon monoxide and hydrocarbon, reduction of nitrous oxide and decomposition of ozone, comprising an active complex containing a fine cluster formed of gold and a reducible transition metal oxide, and a porous support consisting of oxides of cerium and titanium. Also, Japanese Unexamined Patent Publication (Kohyo) No. 2001-524030 specifically discloses $Co_2O_3$ as the reducible transition metal oxide. Furthermore, Japanese Unexamined Patent Publication (Kohyo) No. 2001-524030 describes that according to the above gold catalyst, reduction of nitrous oxide and oxidation of carbon monoxide and hydrocarbon can be simultaneously performed at a low temperature as well as at a high temperature.

SUMMARY OF THE INVENTION

Problems to be Solved by the Invention

Co (cobalt) proposed as a catalyst component or a promoter component in the above prior art documents is known to have an ability to dissociate NO especially in the metal state, and therefore is one of several potential catalyst components capable of substituting for the platinum group element. However, generally, a base metal such as cobalt is known to be easily oxidized compared with the platinum group element. For this reason, even if such a base metal is used as a catalyst component for the exhaust gas purification catalyst, the base metal is relatively easily oxidized by an oxidizing component such as oxygen contained in the exhaust gas. In this case, since metalation of the base metal is poor, sufficient catalytic activity cannot be achieved for the exhaust gas purification, and in particular the reduction purification of NOx.

Accordingly, in order to achieve a high catalytic activity for the exhaust gas purification by maintaining a base metal such as cobalt not in an oxide state, but in a metal state, it is typically necessary to control the air-fuel ratio of the exhaust gas to, for example, an air-fuel ratio sufficiently richer than the theoretical air-fuel ratio (stoichiometric ratio). However, driving in such a fuel-rich atmosphere incurs a significant reduction in the fuel economy, and therefore is generally not preferable.

Therefore, an object of the present invention is to provide a novel exhaust gas purification catalyst comprising cobalt as a catalyst component, in which the exhaust gas purification activity, in particular the NOx reduction activity is improved; and a production method thereof.

Means for Solving the Problems

The present invention for attaining this object is as follows.

(1) An exhaust gas purification catalyst, comprising a catalyst support and a plurality of bimetallic particles supported thereon, wherein the bimetallic particles consist of gold and cobalt and have an average particle size of greater than 0 nm but 100 nm or less.

(2) The exhaust gas purification catalyst as described in item (1), wherein when the exhaust gas purification catalyst is analyzed using a scanning transmission electron microscope equipped with an energy dispersive X-ray analyzer (STEM-EDX) under condition in which the spot size of an electron beam is 1 nm or less, both gold and cobalt elements are detected at a majority of measurement points for randomly selected 5 or more metal particles.

(3) The exhaust gas purification catalyst as described in item (2), wherein when the exhaust gas purification catalyst is analyzed using a scanning transmission electron microscope equipped with an energy dispersive X-ray analyzer (STEM-EDX) under condition in which the spot size of an electron beam is 1 nm or less, both gold and cobalt elements are detected at 70% or more of measurement points for randomly selected 10 or more metal particles.

(4) The exhaust gas purification catalyst as described in any one of items (1) to (3), wherein the bimetallic particles have an average particle size of greater than 0 nm but 20 nm or less.

(5) The exhaust gas purification catalyst as described in item (4), wherein the bimetallic particles have an average particle size of greater than 0 nm but 10 nm or less.

(6) The exhaust gas purification catalyst as described in any one of items (1) to (5), wherein the bimetallic particles have an average gold content of greater than 0 atomic % but 70 atomic % or less.

(7) The exhaust gas purification catalyst as described in item (6), wherein the bimetallic particles have an average gold content of 5 atomic % or more but 50 atomic % or less.

(8) The exhaust gas purification catalyst as described in item (7), wherein the bimetallic particles have an average gold content of 10 atomic % or more but 25 atomic % or less.

(9) A method for producing an exhaust gas purification catalyst comprising a catalyst support and a plurality of bimetallic particles supported thereon wherein the bimetallic particles consist of gold and cobalt and have an average particle size of greater than 0 nm but 100 nm or less, wherein the method comprises:

heating a mixed solution containing a gold salt, a cobalt salt, a solvent and an inorganic reducing agent to a temperature sufficient to reduce gold and cobalt, thereby producing bimetallic particles consisting of gold and cobalt, and supporting the produced bimetallic particles on the catalyst support.

(10) The method as described in item (9), wherein when the exhaust gas purification catalyst is analyzed using a scanning transmission electron microscope equipped with an energy dispersive X-ray analyzer (STEM-EDX) under condition in which the spot size of an electron beam is 1 nm or less, both gold and cobalt elements are detected at a majority of measurement points for randomly selected 5 or more metal particles.

(11) The method as described in item (10), wherein when the exhaust gas purification catalyst is analyzed using a scanning transmission electron microscope equipped with an energy dispersive X-ray analyzer (STEM-EDX) under condition in which the spot size of an electron beam is 1 nm or less, both gold and cobalt elements are detected at 70% or more of measurement points for randomly selected 10 or more metal particles.

(12) The method as described in any one of items (9) to (11), wherein the bimetallic particles have an average particle size of greater than 0 nm but 20 nm or less.

(13) The method as described in item (12), wherein the bimetallic particles have an average particle size of greater than 0 nm but 10 nm or less.

(14) The method as described in any one of items (9) to (13), wherein the heating step is performed at a temperature of 90° C. or more but 250° C. or less.

(15) The method as described in item (14), wherein the heating step is performed at a temperature of greater than 100° C. but 200° C. or less.

(16) The method as described in any one of items (9) to (15), wherein the solvent is selected from the group consisting of tetraethylene glycol, ethylene glycol, n-propyl alcohol, n-butyl alcohol, sec-butyl alcohol, isobutyl alcohol, glycerin, propylene glycol, isoamyl alcohol, n-amyl alcohol, allyl alcohol, 2-ethoxy alcohol, 1,2-hexadecanediol, dimethylformamide, and combinations thereof.

(17) The method as described in any one of items (9) to (16), wherein the inorganic reducing agent is selected from the group consisting of sodium borohydride, ammonia borane, hydrazine, and combinations thereof.

(18) The method as described in item (17), wherein the inorganic reducing agent is sodium borohydride.

(19) The method as described in any one of items (9) to (18), wherein the mixed solution further contains a protecting agent.

(20) The method as described in any one of items (9) to (19), further comprising a reduction step after the supporting step.

Effect of the Invention

According to the present invention, it is possible to obtain an exhaust gas purification catalyst comprising bimetallic particles consisting of gold and cobalt in which gold and cobalt coexist at the nano-level. Furthermore, according to this exhaust gas purification catalyst, oxidation of cobalt is suppressed by coexistence of gold and cobalt at the nano-level in the same metal particle. As a result, since the catalytic activity of cobalt can be kept high, it is possible to remarkably improve the exhaust gas purification performance of the exhaust gas purification catalyst, especially the NOx reducing ability in a low-temperature region of 400° C. or less or 300° C. or less.

MODE FOR CARRYING OUT THE INVENTION

Figure 1:
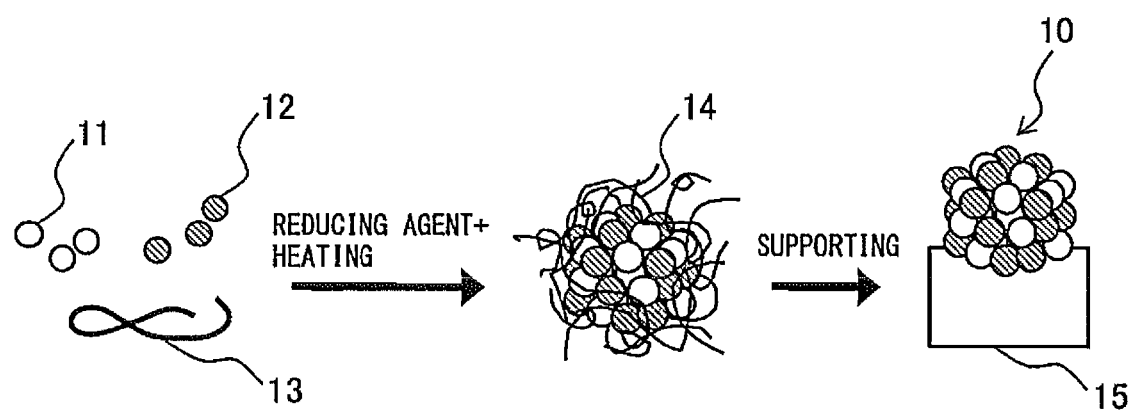
FIG. 1 is a view schematically showing a method for producing an exhaust gas purification catalyst according to the present invention.

The exhaust gas purification catalyst of the present invention comprises a catalyst support and a plurality of bimetallic particles supported thereon, wherein the bimetallic particles consist of gold and cobalt and have an average particle size of greater than 0 nm but 100 nm or less.

As described above, there is a problem in that a base metal such as cobalt is relatively easily oxidized by, for example, an oxidizing component contained in the exhaust gas, resulting in poor metalation of the base metal, and therefore a sufficient catalytic activity cannot be achieved for the exhaust gas purification, especially the reduction purification of NOx.

Thus, the present inventors have taken note of and studied gold having a relatively weak affinity for oxygen, synthesized metal particles in which gold and cobalt coexist at the nano-level, i.e., bimetallic particles consisting of gold and cobalt and having an average particle size of greater than 0 nm but 100 nm or less, and have found that in the bimetallic particles, oxidation of cobalt can be suppressed or reduction of cobalt can be accelerated, as compared with metal particles of cobalt alone.

In addition, the present inventors have further found that an exhaust gas purification catalyst having a remarkably improved NOx reducing ability, for example, in a low-temperature region of 400° C. or less, especially 300° C. or less is obtained by supporting bimetallic particles having an average particle size of greater than 0 nm but 100 nm or less and allowing gold and cobalt to coexist at the nano-level on a catalyst support, as compared with the case of supporting gold and cobalt on a catalyst support by a conventionally known so-called co-impregnation method.

When the metal particles consisting of gold and cobalt have an average particle size of greater than 100 nm, bimetallic particles in which gold and cobalt coexist at the nano-level may fail to be formed. As a result, the oxidation suppressing effect of cobalt due to gold may fail to be sufficiently achieved. In addition, in the case where the metal particles consisting of gold and cobalt have such a large average particle size, the surface area of the metal particles become small, leading to a decrease in the number of cobalt active sites, and therefore a sufficient NOx reducing ability may fail to be achieved in the finally obtained exhaust gas purification catalyst. For this reason, in the exhaust gas purification catalyst of the present invention, the bimetallic particles consisting of gold and cobalt have an average particle size of greater than 0 nm but 100 nm or less, preferably greater than 0 nm but 90 nm or less, greater than 0 nm but 80 nm or less, greater than 0 nm but 70 nm or less, greater than 0 nm but 60 nm or less, greater than 0 nm but 50 nm or less, greater than 0 nm but 40 nm or less, greater than 0 nm but 30 nm or less, greater than 0 nm but 20 nm or less, greater than 0 nm but 15 nm or less, greater than 0 nm but 10 nm or less, or greater than 0 nm but 5 nm or less. By using bimetallic particles having such an average particle size as a catalyst component, it is possible to ensure coexistence of gold and cobalt at the nano-level and fully exert the oxidation suppressing effect of cobalt due to gold. As a result, it is possible to obtain an exhaust gas purification catalyst having a remarkably improved NOx reducing ability, and in particular in a low-temperature region.

Unless otherwise indicated, the term "average particle size" in the present invention refers to an arithmetic mean value of measured values when randomly selected 100 or more particles are measured for the diameter in a fixed direction (Feret diameter) by an electron microscope such as a transmission electron microscope (TEM) and scanning electron microscope (SEM).

In the exhaust gas purification catalyst of the present invention, whether gold and cobalt in the bimetallic particles coexist at the nano-level or are mixed at the atomic level may be determined by, for example, the fact that when the exhaust gas purification catalyst is analyzed using a scanning transmission electron microscope equipped with an energy dispersive X-ray analyzer (STEM-EDX: Scanning Transmission Electron Microscope-Energy Dispersive X-ray Analysis) under condition in which the spot size of an electron beam is 1 nm or less, both gold and cobalt elements are detected at a majority of measurement points for randomly selected 5 or more metal particles. STEM-EDX is an analyzer fabricated by combining a scanning transmission electron microscope (STEM) and an energy dispersive X-ray analyzer (EDX), and an elemental analysis in a specific portion of an STEM image can be performed by using this analyzer.

According to the present invention, for example, when the exhaust gas purification catalyst is analyzed using STEM-EDX under condition in which the spot size of an electron beam is 1 nm or less, if both gold and cobalt elements are detected only at one or two of measurement points for randomly selected 5 metal particles or only one element of gold and cobalt is detected at all of the 5 measurement points, it can be said that gold and cobalt coexist at the nano-level. Therefore, it can be judged that the bimetallic particles of the present invention are not formed in the measured exhaust gas purification catalyst.

In this case, it is believed that gold and cobalt form gold particles and cobalt particles, respectively, and consequently gold and cobalt are separately present in the exhaust gas purification catalyst. More specifically, it is believed that since gold and cobalt do not coexist at the nano-level in such an exhaust gas purification catalyst, it is not possible to obtain the oxidation suppressing effect of cobalt due to gold. In fact, experiments carried out by the present inventors have confirmed that a sufficient NOx reducing ability cannot be achieved in such an exhaust gas purification catalyst.

According to the present invention, the bimetallic particles consisting of gold and cobalt are preferably such that when the exhaust gas purification catalyst is analyzed using STEM-EDX under condition in which the spot size of an electron beam is 1 nm or less, both gold and cobalt elements are detected at 70% or more, more preferably 80% or more, most preferably 90% or more of measurement points for randomly selected 10 or more metal particles. Using such bimetallic particles as a catalyst component makes it possible to fully exert the oxidation suppressing effect of cobalt due to gold, and therefore achieve a remarkably improved exhaust gas purification performance, and in particular a remarkably improved NOx reducing ability.

According to the present invention, the bimetallic particles preferably have an average gold content of greater than 0 atomic % but 70 atomic % or less.

When the bimetallic particles have an average gold content of 0 atomic %, i.e., the bimetallic particles contain no gold, the oxidation suppressing effect of cobalt due to gold cannot be obtained. Accordingly, in this case, a sufficient NOx reducing ability cannot be achieved in the exhaust gas purification catalyst. On the other hand, when the bimetallic particles have an average gold content of greater than 70 atomic %, the number of cobalt active sites in the bimetallic particles becomes small. In addition, in this case, the cobalt active sites may be covered by gold present in a relatively large amount in the bimetallic particles. Therefore, a sufficient NOx reducing ability may fail to be achieved in the finally obtained exhaust gas purification catalyst. For this reason, it is believed that the ratio between gold and cobalt contained in the bimetallic particles has an optimum value in view of the oxidation suppressing effect of cobalt due to gold, the number of cobalt active sites, etc.

According to the present invention, it is possible to maintain the number of cobalt active sites and fully exert the oxidation suppressing effect of cobalt due to gold by controlling the average gold content in the bimetallic particles at greater than 0 atomic % but 70 atomic % or less, preferably 5 atomic % or more but 50 atomic % or less, more preferably 5 atomic % or more but 30 atomic % or less, most preferably 10 atomic % or more but 25 atomic % or less. As a result, it is possible to obtain an exhaust gas purification catalyst having a remarkably improved NOx reducing ability, and in particular in a low temperature region.

The term "average gold content" in the present invention refers to the ratio of the number of gold atoms to the total number of gold atoms and cobalt atoms contained in a gold salt and cobalt salt introduced at the time of synthesis of bimetallic particles.

According to the present invention, a catalyst support for supporting the bimetallic particles consisting of gold and cobalt may include, but is not particularly limited to any metal oxide generally used as a catalyst support in the technical field of an exhaust gas purification catalyst. Such a catalyst support includes, for example, alumina ($Al_2O_3$), zirconia ($ZrO_2$), ceria ($CeO_2$), silica ($SiO_2$), titania ($TiO_2$), or combinations thereof, etc.

The present invention further provides a method for producing an exhaust gas purification catalyst comprising a catalyst support and a plurality of the above bimetallic particles consisting of gold and cobalt supported on the catalyst support.

As a method for producing an exhaust gas purification catalyst comprising a catalyst support and a plurality of metal elements supported thereon, for example, a so-called co-impregnation method, in which respective metal elements are supported by simply impregnating a catalyst support with a mixed solution containing the salts of these metal elements, is generally known. However, bimetallic particles having a particular combination of gold and cobalt, in which these metal elements coexist at the nano-level, cannot be formed by the conventional co-impregnation method. In addition, it is believed that since gold and cobalt are present respectively as gold particles and cobalt particles on the catalyst support in the exhaust gas purification catalyst obtained by such a method, it is not possible to obtain the oxidation suppressing effect of cobalt due to gold, etc. In fact, experiments carried out by the present inventors have confirmed that gold particles having a relatively large particle size are formed, when gold and cobalt are supported on a catalyst support by a co-impregnation method. Accordingly, a sufficient NOx reducing ability cannot be achieved in an exhaust gas purification catalyst in which gold and cobalt are supported on a catalyst support by the conventional co-impregnation method.

On the other hand, Japanese Unexamined Patent Publication (Kohyo) No. 2001-524030 discloses a method where particles comprising gold and cobalt oxide are supported on a catalyst support by a so-called coprecipitation method. However, as in the case of the co-impregnation method, bimetallic particles in which gold and cobalt coexist at the nano-level cannot be formed even by such coprecipitation method.

In addition, as one of methods for producing metal particles comprising a plurality of metal elements, there is known a method comprising adding a reducing agent such as an alcohol to a mixed solution containing salts of respective metal elements constituting the metal particles, and simultaneously reducing ions of respective metal elements contained in the mixed solution under heating, etc., as necessary. For example, J. Phys. Chem., 1933, 97, 5103-5114 describes a method comprising producing metal particles comprising gold and palladium by alcohol reduction. However, even if such a conventionally known method is applied to a particular combination of gold and cobalt elements, it is not possible to produce bimetallic particles in which these metal elements coexist at the nano-level. Further, even if metal particles comprising gold and cobalt are produced by such a method, it is unlikely that the particular effect based on a combination of gold and cobalt, i.e., the oxidation suppressing effect of cobalt due to gold will be obtained, unless these metal elements coexist at the nano-level.

The present inventors have found that bimetallic particles, in which gold and cobalt coexist at the nano-level, especially gold and cobalt are mixed at the atomic level, can be produced by adding not a conventional organic reducing agent such as alcohol, but an inorganic reducing agent such as sodium borohydride to a mixed solution containing a gold salt and a cobalt salt, and heating the mixed solution to a temperature sufficient to reduce gold and cobalt. Furthermore, the present inventors have found that an exhaust gas purification catalyst having a remarkably improved NOx reducing ability, for example, in a low-temperature region of 400° C. or less, especially 300° C. or less can be obtained by introducing a catalyst support into a solution containing the produced bimetallic particles consisting of gold and cobalt, and supporting the bimetallic particles on the catalyst support using a conventionally known method.

FIG. 1 is a view schematically showing a method for producing an exhaust gas purification catalyst according to the present invention. Referring to FIG. 1, for example, first, a gold salt and a cobalt salt are dissolved in one or more solvents to prepare a mixed solution containing $Au^{3+}$ ions 11, $Co^{2+}$ ions 12, and the later-described optional protecting agent 13 such as polyvinylpyrrolidone (PVP). At this time, a complex (not shown) is formed by $Au^{3+}$ ions 11, $Co^{2+}$ ions 12, and optional protecting agent 13. Then, an inorganic reducing agent such as sodium borohydride is added as the reducing agent, and the solution is heated to a temperature sufficient to reduce gold and cobalt, whereby both $Au^{3+}$ ions 11 and $Co^{2+}$ ions 12 dissolved in the mixed solution can be simultaneously reduced. As a result, Au—Co bimetallic particles 14 in which gold and cobalt coexist at the nano-level can be obtained. Next, a catalyst support 15 consisting of a metal oxide, etc., is introduced into a solution containing the Au—Co bimetallic particles 14 synthesized as described above, and then subjecting the catalyst support to drying, firing, etc., makes it possible to obtain the exhaust gas purification catalyst 10 of the present invention comprising the catalyst support 15 and the Au—Co bimetallic particles 14 supported thereon.

According to the method of the present invention, a gold salt and cobalt salt may include, but are not particularly limited to, for example, chlorides, acetates, nitrates, etc.

Also, a solvent used in a mixed solution containing the gold salt and cobalt salt may include any solvent capable of dissolving these metal salts and having a boiling point higher than the heating temperature at the heating step in the method of the present invention can be used. Preferably, such a solvent may include tetraethylene glycol, ethylene glycol, n-propyl alcohol, n-butyl alcohol, sec-butyl alcohol, isobutyl alcohol, glycerin, propylene glycol, isoamyl alcohol, n-amyl alcohol, allyl alcohol, 2-ethoxy alcohol, 1,2-hexadecanediol, dimethylformamide, or combinations thereof. Incidentally, these solvents may have the same effect as that of the later-described protecting agent. For example, in the case where tetraethylene glycol, etc., is used as the solvent in the method of the present invention, it is believed that the solvent not only can merely dissolve a gold salt and a cobalt salt, but also can stabilize the produced bimetallic particles.

In the method of the present invention, the gold salt and cobalt salt may be appropriately added to the above solvent in amounts corresponding to a desired gold content or Au:Co ratio (atomic ratio) in the finally obtained bimetallic particles. The gold salt and cobalt salt may be added to the above solvent in such amounts that the finally obtained bimetallic particles have an average gold content of, but not particularly limited to, generally greater than 0 atomic % but 70 atomic % or less, preferably 5 atomic % or more but 50 atomic % or less, more preferably 5 atomic % or more but 30 atomic % or less, most preferably 10 atomic % or more but 25 atomic % or less.

According to the method of the present invention, an inorganic reducing agent added to a mixed solution containing the gold salt and cobalt salt may include, but is not particularly limited to, for example, a boron-based reducing agent such as sodium borohydride ($NaBH_4$) and ammonia borane ($NH_3BH_3$), hydrazine ($N_2H_4$), or combinations thereof, and preferably sodium borohydride may be used. Such an inorganic reducing agent may be added in an amount sufficient to reduce the gold ions and cobalt ions dissolved in the mixed solution to form bimetallic particles in which gold and cobalt coexist at the nano-level.

With regard to ammonia borane, for example, its applicability as a hydrogen storage material has been reported in prior art documents, etc., but use and usefulness of ammonia borane as a reducing agent in producing metal particles, etc., are not necessarily known in general. Accordingly, it is very unexpected and surprising that as in the method of the present invention, use of ammonia borane as a reducing agent makes it possible to synthesize bimetallic particles in which gold and cobalt coexist at the nano-level can be.

Without being bound by any particular theory, it is believed that in the method of the present invention, for example, if a relatively weak organic reducing agent such as alcohol in place of an inorganic reducing agent such as a boron-based reducing agent or hydrazine is used as the reducing agent, gold ions that are easily reduced compared with cobalt ions are preferentially reduced and undergo particle growth, resulting in separation of gold and cobalt phases and formation of gold particles and cobalt particles, respectively. In contrast, an inorganic reducing agent such as a boron-based reducing agent or hydrazine is known to have a very strong reducing power compared with an organic reducing agent such as alcohol. Therefore, according to the method of the present invention, use of such an inorganic reducing agent as the reducing agent makes it possible to simultaneously reduce both cobalt ions and gold ions dissolved in the mixed solution without preferentially reducing gold ions relative to cobalt ions, unlike the case of using an organic reducing agent such as alcohol. As a result, according to the method of the present invention, it is believed that it is possible to obtain bimetallic particles in which gold and cobalt coexist at the nano-level, especially gold and cobalt are mixed at the atomic level.

Furthermore, in the method of the present invention, a protecting agent may be optionally added to the mixed solution containing a gold salt and cobalt salt, in order to coordinate or adsorb the protecting agent to the surface of the bimetallic particles produced by the method of the present invention to suppress aggregation and particle growth of the bimetallic particles and stabilize them. The protecting agent may include, but is not particularly limited to, preferably a coordinating substance and a substance having an ability of coordinating to both gold element and cobalt element. The protecting agent that can be used in the method of the present invention includes, for example, a polymer compound such as hydrophilic polymer, and an amphipathic molecule.

The hydrophilic polymer includes a hydroxyl group-containing compound such as polyvinyl alcohol (PVA), a cyclic amide-containing compound such as polyvinylpyrrolidone (hereinafter, simply referred to as PVP), a cyclic imide-containing compound, a carboxyl group-containing compound such as polyacrylic acid (PAA), poly(sodium acrylate), poly (potassium acrylate), crosslinked polyacrylic acid partial hydrate and copolymer of acrylic acid and itaconic acid amides, a carboxylic acid ester compound such as saponified vinyl acetate-acrylic acid ester copolymer, an amide group-containing compound such as polyacrylamide, polyacrylamide partial hydrolysate and polyacrylamide partial hydrolysate, a nitrile group-containing compound such as acrylonitrile copolymer, a water-soluble or hydrophilic polymer such as polyvinylpyridine, polyethyleneimine (PEI), polyallylamine, polyamine, N-(3-aminopropyl)diethanolamine, polyamino acid, polyphosphoric acid and heteropolyacid, and copolymers thereof, a natural product such as cyclodextrin, aminopectin, methyl cellulose and gelatin, and the like. Among them, PVP is preferably used.

The amphipathic molecule may have a hydrophilic group and a lipophilic group, and includes an anionic surfactant, e.g., a higher fatty acid alkali salt such as sodium stearate, an alkyl sulfate such as sodium dodecylsulfate, an alkylsulfonate such as sodium dodecylsulfonate, and an alkylarylsulfonate such as sodium ethylbenzenesulfonate; a cationic surfactant, e.g., dodecyltrimethylammonium bromide, a higher amine halate of dodecyltrimethylammonium bromide, an alkylpyridinium halide such as methylpyridinium iodide, and a tetraammonium salt such as tetraalkylammonium iodide; a nonionic surfactant, e.g., a polyethylene glycol fatty acid ester such as polyethylene glycol alkyl ether and polyethylene glycol monolaurate, and a sorbitan fatty acid ester; and an amphoteric surfactant such as amino acid. In the method of the present invention, adding the protecting agent to the mixed solution containing a gold salt, a cobalt salt, a solvent and an inorganic reducing agent can make certain that the size of the obtained bimetallic particles is controlled to a nanometer size.

In the method of the present invention, the order of mixing a gold salt, a cobalt salt, an inorganic reducing agent and an optional protecting agent is not particularly limited, and they may be mixed in an arbitrary order. For example, after adding an optional protecting agent to a solution containing a gold salt and a cobalt salt, an inorganic reducing agent may be added thereto, or after adding an inorganic reducing agent to an optional protecting agent, a solution containing a gold salt and a cobalt salt may be added to the resulting mixed solution.

According to the method of the present invention, in a heating step, a mixed solution containing a gold salt, a cobalt salt, a solvent, an inorganic reducing agent and an optional protecting agent is heated to a temperature sufficient to reduce gold and cobalt, especially a temperature of 90° C. or more but 250° C. or less, preferably greater than 100° C. but 250° C. or less, more preferably greater than 100° C. but 200° C. less. Incidentally, this heating step may be performed over an appropriate time period depending on the kind of the inorganic reducing agent used or the heating temperature, and the heating step is not particularly limited, but may be generally performed at the above temperature for 15 minutes to 5 hours, especially 30 minutes to 3 hours. However, since the gold ions are easily reduced compared with the cobalt ions as described above, it is not preferred to previously heat the solution containing a gold salt before mixing with the inorganic reducing agent. Therefore, in order to prevent the gold ions from being preferentially reduced relative to the cobalt ions and undergoing particle growth, for example, it is preferable to mix a solution containing a gold salt and a cobalt salt with an inorganic reducing agent under a low temperature such as room temperature, and then heat the mixed solution.

In the method of the present invention, when a boron-based reducing agent such as sodium borohydride and ammonia borane is used as the inorganic reducing agent, the boron-based reducing agent remains in the solution containing bimetallic particles consisting of gold and cobalt produced in the heating step in the method of the present invention. This boron-based reducing agent cannot be sufficiently decomposed and removed by a drying and firing treatment, etc., in the subsequent supporting step. Accordingly, after simultaneously reducing gold ions and cobalt ions using a boron-based reducing agent, the solution is preferably subjected to a purification treatment with a large amount of acetone, etc. Sine this treatment permits extraction of the residual boron-based reducing agent into an acetone phase, the obtained bimetallic particles can be easily purified.

On the other hand, in the present invention, when hydrazine, etc., is used as the inorganic reducing agent, the hydrazine can be easily decomposed and removed by a drying and firing treatment, etc., in the subsequent supporting step. Therefore, in the case of using hydrazine, etc., as the inorganic reducing agent in the method of the present invention, an additional step such as purification treatment for removing the inorganic reducing agent need not be added before the supporting step, and thus the process can be more simple, compared with the case of using a boron-based reducing agent such as sodium borohydride or ammonia boron.

According to the method of the present invention, a catalyst support for supporting the bimetallic particles consisting of gold and cobalt in the supporting step may include, but is not particularly limited to, any metal oxide generally used as a catalyst support in the technical field of an exhaust gas purification catalyst. Such a catalyst support includes, for example, alumina ($Al_2O_3$), zirconia ($ZrO_2$), ceria ($CeO_2$), silica ($SiO_2$), titania ($TiO_2$), or combinations thereof, etc., as described above.

Supporting of bimetallic particles consisting of gold and cobalt on the above catalyst support may be performed by any method known to a person skilled in the art. For example, a solution containing bimetallic particles consisting of gold and cobalt synthesized as described above is added to, for example, a powder of a metal oxide (catalyst support) dispersed in a predetermined amount of a solution so that the amount of gold and/or cobalt relative to the catalyst support generally ranges from 0.01 to 10 wt %. Then, the obtained solution may be dried and fired at a predetermined temperature for a predetermined time period, especially at a temperature and for a time period sufficient to decompose and remove the salt portion of the metal salt, the optional protecting agent, etc., and possibly the inorganic reducing agent and to support the bimetallic particles on the catalyst support, thereby obtaining an exhaust gas purification catalyst comprising a catalyst support and a plurality of bimetallic particles consisting of gold and cobalt supported thereon.

According to the method of the present invention, it is possible to obtain an exhaust gas purification catalyst comprising supported bimetallic particles consisting of gold and cobalt and having an average particle size of greater than 0 nm but 100 nm or less, especially greater than 0 nm but 20 nm or less, greater than 0 nm but 10 nm or less, or greater than 0 nm but 5 nm or less. Moreover, in the bimetallic particles, gold and cobalt coexist at the nano-level, and for example, the bimetallic particles are such that when the exhaust gas purification catalyst is analyzed using a scanning transmission electron microscope equipped with an energy dispersive X-ray analyzer (STEM-EDX) under condition in which the spot size of an electron beam is 1 nm or less, both gold and cobalt elements are detected at a majority of measurement points for randomly selected 5 or more metal particles, preferably at 70% or more, more preferably 80% or more, most preferably 90% or more of measurement points for randomly selected 10 or more metal particles. Therefore, according to the exhaust gas purification catalyst obtained by the method of the present invention, it is possible to fully exert the oxidation suppressing effect of cobalt due to gold, and therefore achieve a remarkably improved exhaust gas purification performance, especially a remarkably improved NOx reducing ability.

In the method of the present invention, a reduction step may be optionally further performed after the above supporting step. The exhaust gas purification catalyst obtained by the method of the present invention may be reduced in the reduction step, thereby unfailingly reducing the cobalt in the bimetallic particles to a highly active metal state. This reduction treatment can be performed by any method known to a person skilled in the art. For example, the powder of the exhaust gas purification catalyst obtained by the method of the present invention can be treated in a reducing atmosphere, especially a hydrogen-containing atmosphere at a temperature of 300 to 800° C. for 5 minutes to 1 hour. Alternatively, the above reduction treatment may be performed after addition of a predetermined binder, etc., to the powder of the exhaust gas purification catalyst obtained by the method of the present invention, and coating of a catalyst substrate such as a cordierite-made honeycomb substrate with the exhaust gas purification catalyst.

The present invention is described in more detail below based on Examples, but the present invention is not limited thereto.

EXAMPLES

In the following Examples, exhaust gas purification catalysts comprising Au—Co bimetallic particles as a catalyst component were prepared, and the properties and NOx purification performance thereof were investigated.

Example 1

Synthesis of Au—Co Bimetallic Particles (Average Au Content: 50 Atomic %)

First, 120 mL of tetraethylene glycol as a solvent was introduced into a 300 mL beaker, and 7.5 g (67.5 mmol) of polyvinylpyrrolidone (PVP K-25, average molecular weight: 35,000) as a protecting agent, and 0.84 g (3.38 mmol) of cobalt (II) acetate tetrahydrate ($Co(CH_3COO)_2 \cdot 4H_2O$) were added thereto and dissolved by heating the solution to a temperature of 80° C. while applying an ultrasonic wave. Then, the resulting solution was cooled to room temperature, and 2.19 g (3.38 mmol) of an aqueous 30 wt % gold chloride ($HAuCl_4$) solution dissolved in 40 mL of tetraethylene glycol was added thereto. Then, the obtained solution was bubbled with nitrogen for 10 minutes so as to expel oxygen in the solution and create a condition under which gold and cobalt can be easily reduced. Then, 1.02 g (27 mmol) of sodium borohydride ($NaBH_4$) as an inorganic reducing agent dissolved in 40 mL of tetraethylene glycol was added to the solution, followed by stirring at room temperature for 30 minutes. Then, the obtained mixed solution was heated to 160° C. using an oil bath, held and stirred at this temperature for 1 hour to reduce gold, and cobalt, and then cooled to room temperature.

Next, the obtained solution was transferred to a 3 L beaker, and 10-fold diluted with acetone. Then, the diluted solution was treated for 10 minutes with a centrifuge (3,000 rpm) to precipitate the product. Then, the supernatant was discarded, and the remaining sodium borohydride was removed. Finally, 80 mL of ethanol was added to the obtained black precipitate, and the black precipitate was re-dispersed in ethanol to obtain a dispersion liquid containing Au—Co bimetallic particles having an average Au content of 50 atomic %.

[Preparation of Au—Co/$SiO_2$ (Average Au Content: 50 Atomic %)]

Next, 17.3 g of silica (Nanotec $SiO_2$) was added to the dispersion liquid obtained above containing Au—Co bimetallic particles (average Au content: 50 atomic %) such that the total amount of Au and Co supported is 5 wt % relative to the catalyst support, and then the dispersion medium was removed by heating at about 100° C. Then, after drying at 120° C. for 8 hours, the dried sample was ground in a mortar, and the obtained powder was fired in air at 500° C. for 2 hours. Then, the obtained powder was compacted molded under a pressure of 196 MPa and then sieved to obtain a pellet-shaped catalyst having a size of 1.0 to 1.7 mm. In this Example, 2 g of the obtained catalyst was further placed in a flow-type reaction furnace, and was subjected to a reduction treatment at 600° C. over 15 minutes under a flow of reducing gas consisting of 1 vol % $H_2/N_2$ balance. Thereafter, the catalyst was cooled to 100° C. or less in the same atmosphere to obtain an exhaust gas purification catalyst consisting of Au—Co/$SiO_2$ (average Au content: 50 atomic %).

Example 2

Preparation of Au—Co/$SiO_2$ (Average Au Content: 25 Atomic %)

A dispersion liquid containing Au—Co bimetallic particles having an average Au content of 25 atomic % was obtained in the same manner as in Example 1, except for changing the amount of cobalt (TI) acetate tetrahydrate to 1.27 g (5.10 mmol) and the amount of the aqueous 30 wt % gold chloride solution to 1.07 g (1.65 mmol). Then, an exhaust gas purification catalyst consisting of Au—Co/$SiO_2$ (average Au content: 25 atomic %) was obtained in the same manner as in Example 1, except for changing the amount of silica to 12.5 g.

Example 3

Preparation of Au—Co/$SiO_2$ (Average Au Content: 10 Atomic %)

A dispersion liquid containing Au—Co bimetallic particles having an average Au content of 10 atomic % was obtained in the same manner as in Example 1, except for changing the amount of cobalt (II) acetate tetrahydrate to 1.51 g (6.08 mmol) and the amount of the aqueous 30 wt % gold chloride solution to 0.44 g (0.68 mmol). Then, an exhaust gas purification catalyst consisting of Au—Co/$SiO_2$ (average Au content: 10 atomic %) was obtained in the same manner as in Example 1, except for changing the amount of silica to 9.85 g.

Comparative Example 1

Preparation of Au/$SiO_2$ (Average Au Content: 100 Atomic %)

A dispersion liquid containing Au metal particles was obtained in the same manner as in Example 1, except for changing the amount of the aqueous 30 wt % gold chloride solution to 4.37 g (6.75 mmol) and not adding cobalt (II) acetate tetrahydrate, etc. Then, an exhaust gas purification catalyst consisting of Au/$SiO_2$ (average Au content: 100 atomic %) was obtained in the same manner as in Example 1, except for changing the amount of silica to 26.6 g.

Comparative Example 2

Preparation of Co/$SiO_2$ (Average Au Content: 0 Atomic %)

A dispersion liquid containing Co metal particles was obtained in the same manner as in Example 1, except that changing the amount of cobalt (II) acetate tetrahydrate to 1.68 g (6.75 mmol) and not adding the aqueous 30 wt % gold chloride solution, etc. Then, an exhaust gas purification catalyst consisting of Co/$SiO_2$ (average Au content: 0 atomic %) was obtained in the same manner as in Example 1, except for changing the amount of silica to 7.96 g.

Comparative Example 3

Preparation of Physically Mixed Catalyst of Au/$SiO_2$ and Co/$SiO_2$ (Average Au Content: 50 Atomic %)

In this Comparative Example, an exhaust gas purification catalyst consisting of Au/$SiO_2$ and Co/$SiO_2$ was prepared by merely physically mixing Au/$SiO_2$ and Co/$SiO_2$. Specifically, first, a dispersion liquid containing Au metal particles was obtained in the same manner as in Comparative Example 1. Then, 17.5 g of silica was added to this dispersion liquid to obtain a catalyst consisting of Au/SiO$_2$ (average Au content: 100 atomic %), in which Au was supported on the silica and the amount of Au supported was 7.6 wt % relative to silica. Next, a dispersion liquid containing Co metal particles was obtained in the same manner as in Comparative Example 2. Then, 17.3 g of silica was added to this dispersion liquid to obtain a catalyst consisting of Co/SiO$_2$ (average Au content: 0 atomic %), in which Co was supported on the silica and the amount of Co supported was 2.4 wt % relative to silica. Then, 17 g of each of two catalysts was weighed, and after mixing these catalysts in a mortar, an exhaust gas purification catalyst (average Au content: 50 atomic %) consisting of Au/SiO$_2$ and Co/SiO$_2$ was obtained in the same manner as in Example 1, etc.

Comparative Example 4

Preparation of Au,Co/SiO$_2$ (Average Au Content: 25 Atomic %)

In this Comparative Example, an Au,Co/SiO$_2$ was prepared by merely supporting gold and cobalt on silica using a conventional co-impregnation method. Specifically, first, 50 mL of distilled water was introduced into a 300 mL beaker, and 1.41 g of an aqueous gold chloride (HAuCl$_4$) solution and 1.35 g of cobalt (II) acetate tetrahydrate (Co(CH$_3$COO)$_2$.4H$_2$O) were added thereto, followed by stirring at room temperature. After completely dissolving them, 15 g of silica (Nanotec SiO$_2$) was added thereto, and the dispersion medium was removed by heating. Then, after drying at 120° C. for 1 hour, the dried sample was ground in a mortar into a uniform powder, and the obtained powder was fired in air at 500° C. for 2 hours. Then, the obtained powder was compacted molded under a pressure of 196 MPa and then sieved to obtain a pellet-shaped catalyst having a size of 1.0 to 1.7 mm. Furthermore, 2 g of the obtained catalyst was placed in a flow-type reaction furnace, and was subjected to a reduction treatment at 600° C. over 15 minutes under a flow of reducing gas consisting of 1 vol % H$_2$/N$_2$ balance. Thereafter, the catalyst was cooled to 100° C. or less in the same atmosphere to finally obtain an exhaust gas purification catalyst consisting of Au,Co/SiO$_2$ (average Au content: 25 atomic %), in which the total amount of Au and Co supported was 5 wt % relative to silica.
[Analysis of Catalyst]

The exhaust gas purification catalysts obtained in Examples 2 and 3 and Comparative Examples 2 and 3 were measured by a scanning transmission electron microscope (STEM) (JEM-1000 manufactured by JEOL Ltd., accelerating voltage: 200 kV). Here, measurement samples were diluted with ethanol, and added dropwise to a molybdenum grid. Then, they were dried and used in the measurement. FIGS. 2 to 5 show the results thereof.

FIGS. 2 to 5(a) show photographs of the exhaust gas purification catalysts of Examples 2 and 3 and Comparative Examples 2 and 4, respectively, taken by a scanning transmission electron microscope (STEM), and FIGS. 2 to 5(b) and (c) show enlarged photographs thereof.

Figure 2:
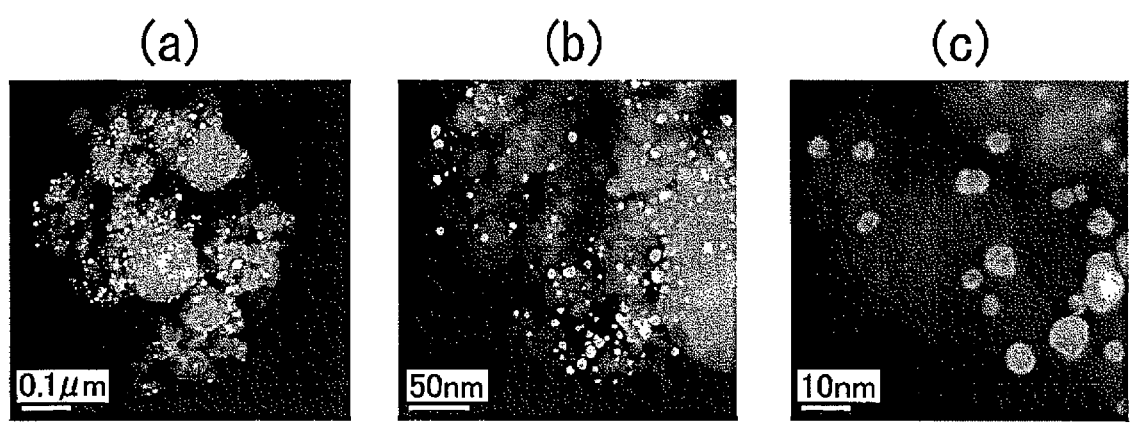
FIG. 2(a) shows a photograph of the exhaust gas purification catalyst of Example 2 taken by a scanning transmission electron microscope (STEM), and FIGS. 2(b) and (c) show enlarged photographs thereof.
Figure 3:
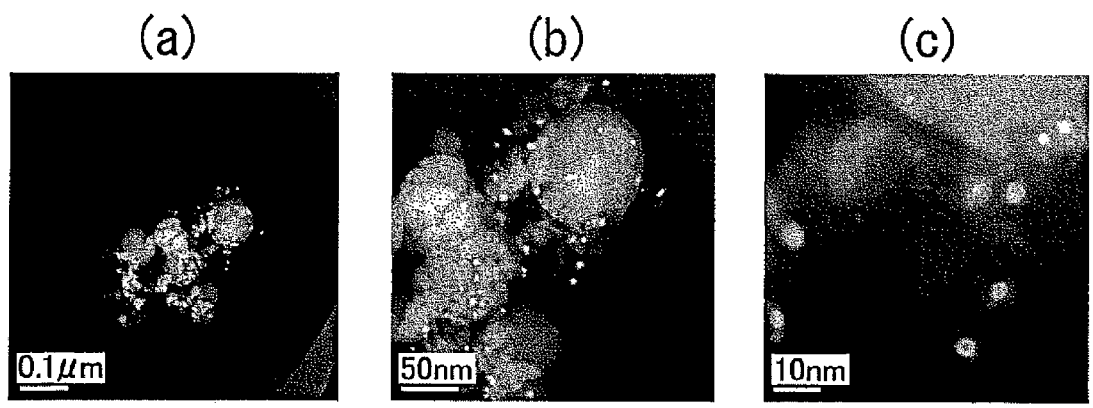
FIG. 3(a) shows a photograph of the exhaust gas purification catalyst of Example 3 taken by STEM, and FIGS. 3(b) and (c) show enlarged photographs thereof.
Figure 4:
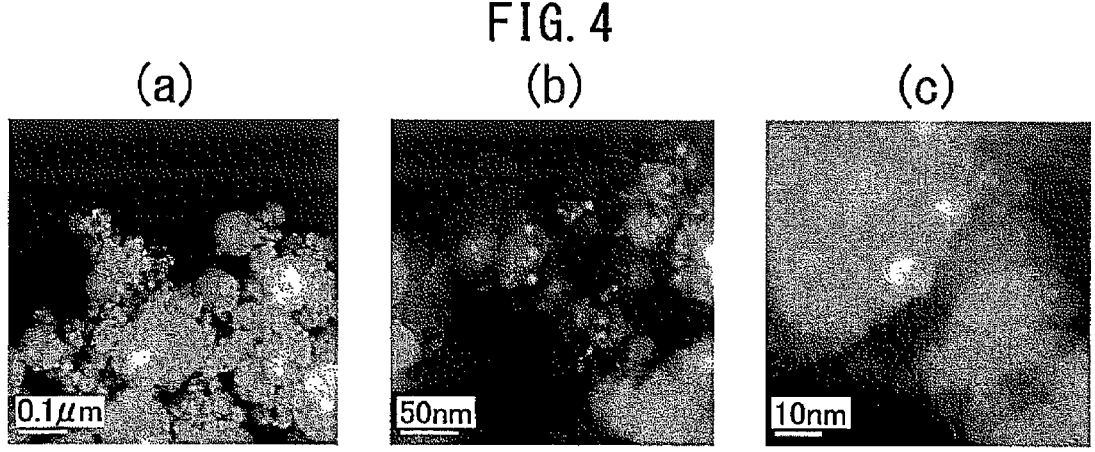
FIG. 4(a) shows a photograph of the exhaust gas purification catalyst of Comparative Example 2 taken by STEM, and FIGS. 4(b) and (c) show enlarged photographs thereof.
Figure 5:
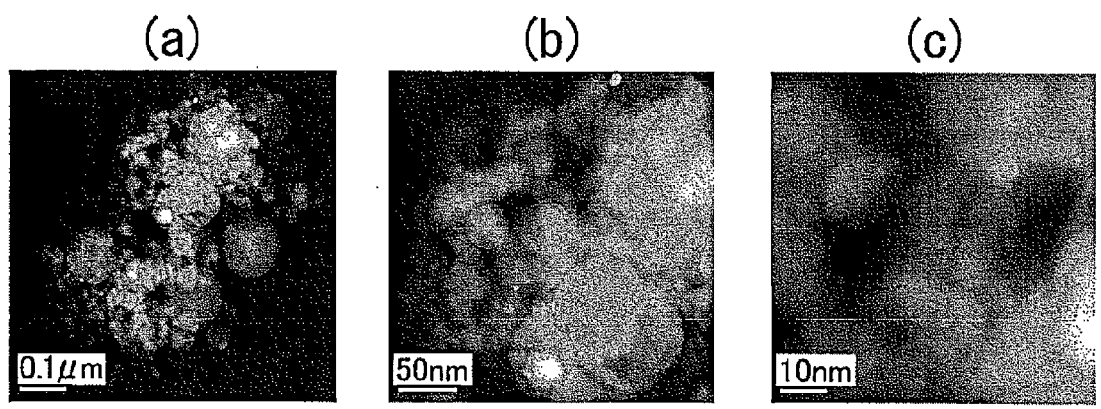
FIG. 5(a) shows a photograph of the exhaust gas purification catalyst of Comparative Example 4 taken by STEM, and FIGS. 5(b) and (c) show enlarged photographs thereof.

Referring to FIGS. 2 and 3, it can be confirmed that in Au—Co/SiO$_2$ (average Au content: 25 atomic %) of Example 2 and Au—Co/SiO$_2$ (average Au content: 10 atomic %) of Example 3, very fine metal particles having an average particle size of apparently 10 nm or less are present on the silica support. Furthermore, many metal particles in FIGS. 2 and 3 had a particle size of 5 nm or less. In particular, referring to FIG. 3(c), in Au—Co/SiO$_2$ (average Au content: 10 atomic %) of Example 3, it was suggested from the contrast in the STEM image regarding the metal particles that the metal particles have a core-shell structure consisting of, for example, a core part containing Au as the main component and a shell part containing Co as the main component. Furthermore, referring to FIG. 4, in Co/SiO$_2$ (average Au content: 0 atomic %) of Comparative Example 2 in which only Co was supported, somewhat large metal particles (Co particles) are observed compared with Examples 2 and 3, but the presence of metal particles of 5 nm or less can also be confirmed. In contrast, referring to FIG. 5, in Au,Co/SiO$_2$ (average Au content: 25 atomic %) of Comparative Example 4 prepared by a so-called co-impregnation method, the presence of many metal particles having a relatively large particle size of tens of nanometers was confirmed.

Figure 6:
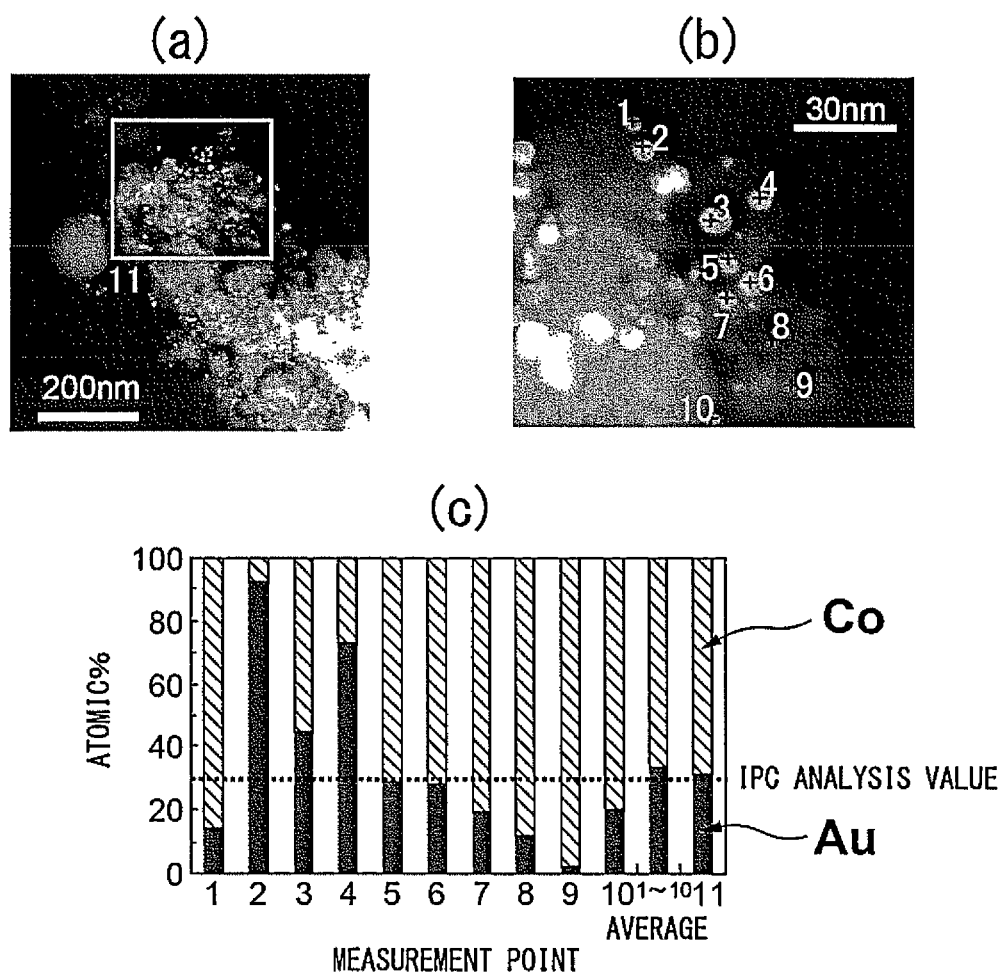
FIG. 6 shows an analysis of the exhaust gas purification catalyst of Example 2 by STEM-EDX.
Figure 7:
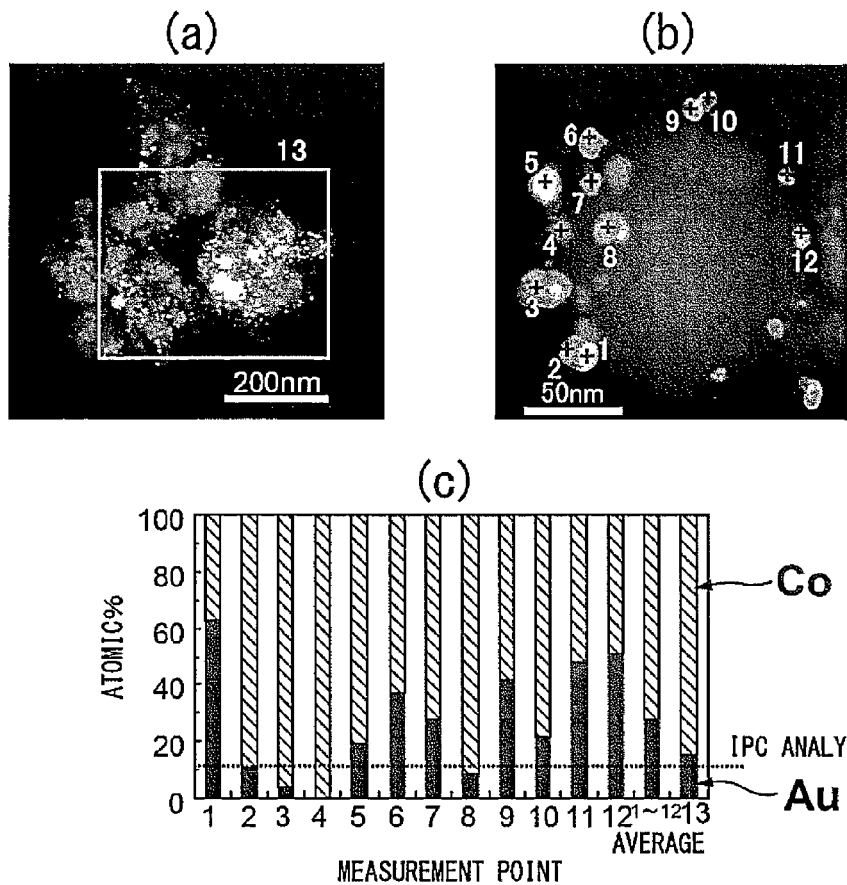
FIG. 7 shows an analysis of the exhaust gas purification catalyst of Example 3 by STEM-EDX.

FIGS. 6 and 7 show analyses of the exhaust gas purification catalysts of Examples 2 and 3 by a scanning transmission electron microscope equipped with an energy dispersive X-ray analyzer (STEM-EDX) (JEM-1000 manufactured by JEOL Ltd.). Specifically, FIGS. 6(a) and (b) show photographs of the exhaust gas purification catalyst of Example 2 taken by STEM-EDX, and FIG. 6(c) shows the compositional ratio (atomic %) of gold and cobalt at measurement points 1 to 10 for the metal particles (analyzed under condition in which the spot size of an electron beam is 1 nm or less) as well as in region 11 in FIGS. 6(a) and (b). Also, FIGS. 7(a) and (b) show photographs of the exhaust gas purification catalyst of Example 3 taken by STEM-EDX, and FIG. 7(c) shows the compositional ratio (atomic %) of gold and cobalt at measurement points 1 to 12 for the metal particles (analyzed under condition in which the spot size of an electron beam is 1 nm or less) as well as in region 13 in FIGS. 7(a) and (b). Here, the dashed line in FIGS. 6 and 7 indicates the measured value when each of the exhaust gas purification catalysts of Examples 2 and 3 is analyzed by ICP (inductively coupled plasma) emission analysis.

Referring to FIG. 6(c), it is understood that both god and cobalt elements are detected at all of the measurement points 1 to 10 for the metal particles. In addition, a slight variation was observed in the compositional ratio of gold and cobalt in the metal particles at the measurement points 1 to 10, but the average value thereof was very consistent with the compositional ratio of gold and cobalt in the entire exhaust gas purification catalyst obtained by the ICP emission analysis (dashed line in FIG. 6(c)). Furthermore, it was observed that the average value was also consistent to some extent with the charging ratio of gold and cobalt (Au:Co=1:3). On the other hand, in FIG. 7(c), both gold and cobalt elements were detected at 11 measurement points other than measurement point 4 of measurement points 1 to 12 for the metal particles. In addition, there was observed a tendency that the compositional ratio of gold and cobalt in the metal particles at the measurement points 1 to 12 and the average value thereof are high in the gold content, compared with the compositional ratio of gold and cobalt in the entire exhaust gas purification catalyst obtained by the ICP emission analysis (the dashed line in FIG. 7(c)) and the charging ratio of gold and cobalt (Au:Co=1:9).

Figure 8:
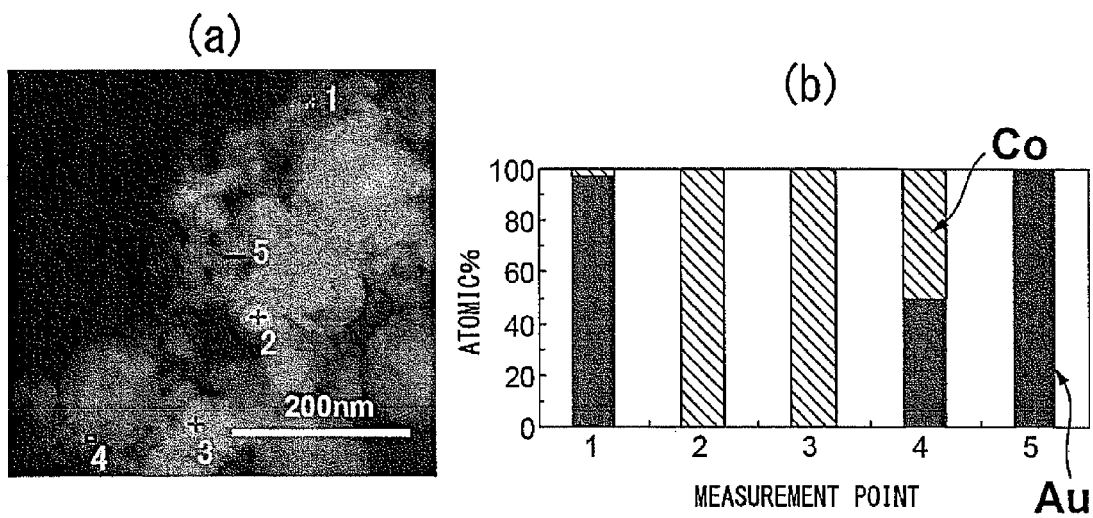
FIG. 8 shows an analysis of the exhaust gas purification catalyst of Comparative Example 4 by STEM-EDX.

FIG. 8 shows an analysis of the exhaust gas purification catalyst of Comparative Example 4 prepared using the conventional co-impregnation method by STEM-EDX. Specifically, FIG. 8(a) shows a photograph of the exhaust gas purification catalyst of Comparative Example 4 taken by STEM-EDX, and FIG. 8(b) shows the compositional ratio (atomic %) of gold and cobalt at measurement points 1 to 5 for the metal particles in FIG. 8(a) (analyzed under condition in which the spot size of an electron beam is 1 nm or less). Referring to FIG. 8(b), both gold and cobalt elements were detected only at two of the measurement points 1 to 5 for the metal particles, i.e., measurement points 1 and 4. In addition, the compositional ratio of gold and cobalt obtained at these measurement points was completely different form the charging ratio of gold and cobalt (Au:Co=1:3). Furthermore, as is clear from the photograph of FIG. 8(a), in the exhaust gas purification catalyst of Comparative Example 4, the presence of many metal particles having a relatively large particle size of tens of nanometers was confirmed. In addition, it was confirmed from the analysis by EDX that these coarse metal particles mainly or completely consist of gold, and therefore gold and cobalt are present separately from each other in the exhaust gas purification catalyst of Comparative Example 4.

[Analysis of Catalyst by X-Ray Diffraction]

The exhaust gas purification catalysts of Examples 2 and 3 and Comparative Example 2 were measured by X-ray diffraction (XRD) (RINT2000 manufactured by Rigaku Corporation). Specific conditions for measurement are as follows.

| | |
|---|---|
| Measuring method: | FT method (Fixed Time method) |
| X-Ray source: | CuKα |
| Sampling interval: | 0.02 deg. |
| Scan speed: | 2.4 deg./min |
| Divergence slit (DS): | ⅔ deg. |
| Scattering slit (SS): | ⅔ deg. |
| Light receiving slit (RS): | 0.5 mm |
| Tube voltage: | 50 kV |
| Tube current: | 300 mA |

Figure 9:
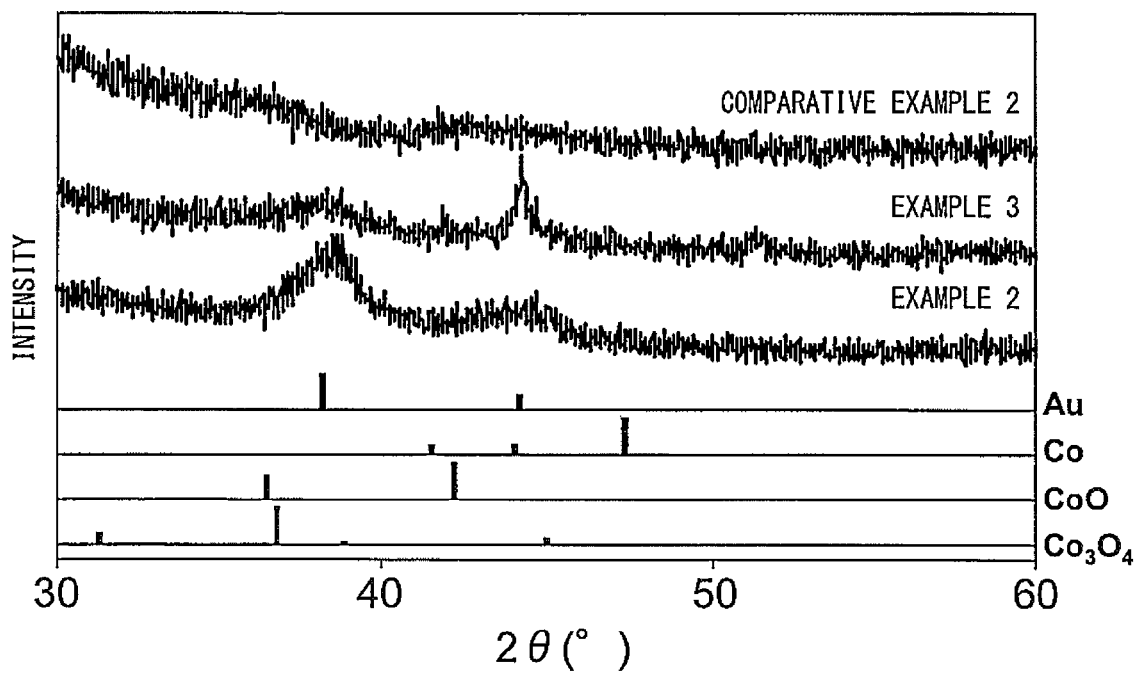
FIG. 9 is a view showing the X-ray diffraction patterns on the exhaust gas purification catalysts of Examples 2 and 3 and Comparative Example 2.

FIG. 9 is a view showing the X-ray diffraction patterns on the exhaust gas purification catalysts of Examples 2 and 3 and Comparative Example 2. FIG. 9 also shows literature values of diffraction peaks for Au, Co, CoO and $Co_3O_4$ for reference. Referring to FIG. 9, only a diffraction peak derived from fcc (face centered cube) structure was observed in Au—Co/$SiO_2$ (average Au content: 25 atomic %) of Example 2, whereas unassigned peaks (e.g., around 52°) were detected other than fcc structure in Au—Co/$SiO_2$ (average Au content: 10 atomic %) of Example 3.

In Co/$SiO_2$ (average Au content: 0 atomic %) of Comparative Example 2 in which only Co was supported, a distinct diffraction peak was not detected. Considering the results of the XRD analysis and the previous STEM observation, it is believed that relatively uniform Au—Co bimetallic particles having fcc structure are formed in Au—Co/$SiO_2$ (average Au content: 25 atomic %) of Example 2. In addition, it is believed that Au—Co bimetallic particles having a core-shell structure, in which the exterior of a fine crystal having fcc structure is covered with a layer having another crystal structure, e.g., a Co or Au—Co layer, are likely to be formed in Au—Co/$SiO_2$ (average Au content: 10 atomic %) of Example 3.

[Activity Evaluation of Catalyst]

Figure 10:
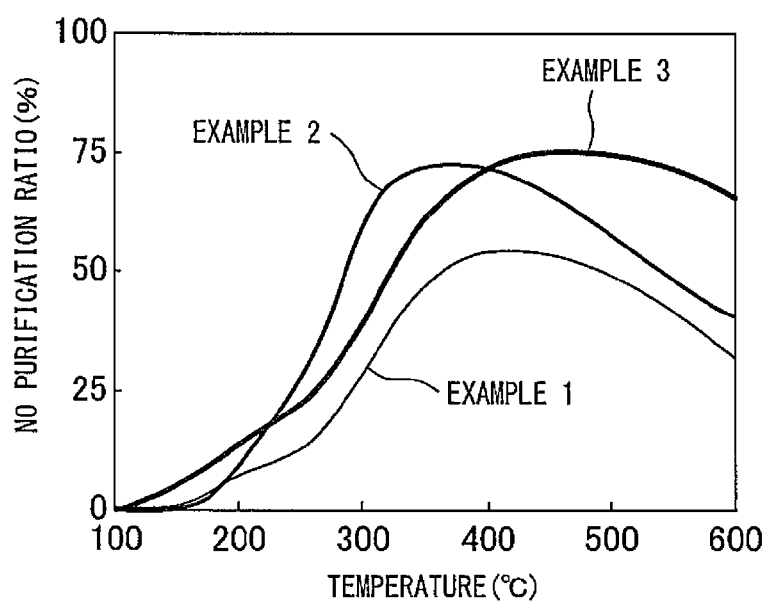
FIG. 10 is a graph showing the NO purification ratio on the exhaust gas purification catalysts of Examples 1 to 3.
Figure 11:
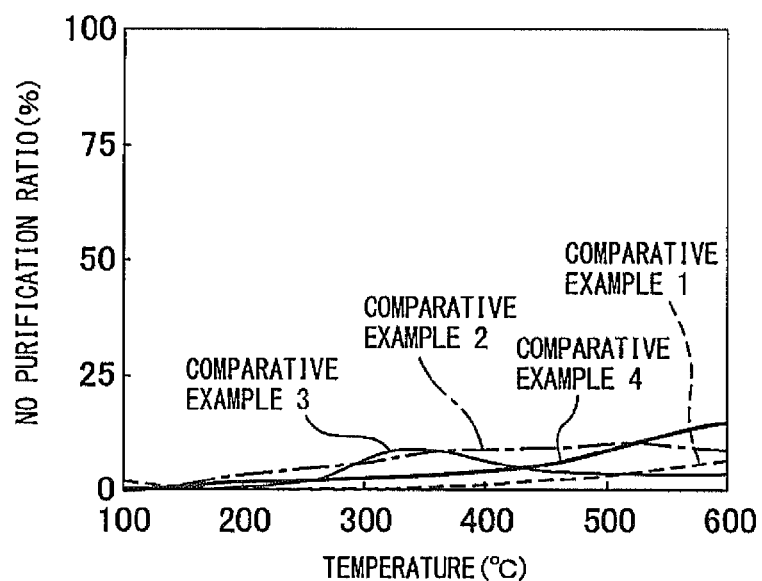
FIG. 11 is a graph showing the NO purification ratio on the exhaust gas purification catalysts of Comparative Examples 1 to 4.

Next, the exhaust gas purification catalysts of Examples 1 to 3 and Comparative Examples 1 to 4 were evaluated for the NOx reducing ability in an NO—CO reaction. Specifically, 2.0 g of a pellet of each of the exhaust gas purification catalysts prepared above was set in a flow-type reactor. Then, the temperature of the catalyst bed was raised from 100° C. at a rate of 20° C./min while flowing a model gas for evaluation (NO: 3,000 ppm, CO: 3,000 ppm, $N_2$ balance) at a flow rate of 10 L/min to the catalyst bed, and the NO purification ratio until 600° C. was measured using an FT-IR analyzer. FIGS. 10 and 11 show the results thereof.

FIG. 10 is a graph showing the NO purification ratio on the exhaust gas purification catalysts of Examples 1 to 3. Similarly, FIG. 11 is a graph showing the NO purification ratio on the exhaust gas purification catalysts of Comparative Examples 1 to 4. FIGS. 10 and 11 show the temperature (° C.) of the catalyst bed on the abscissa, and show the NO purification ratio (%) on the ordinate. As is clear from the results of FIGS. 10 and 11, the exhaust gas purification catalysts of Examples 1 to 3, in which Au—Co bimetallic particles were supported, were able to achieve a very high NOx reducing ability at all of the temperatures, and a remarkably improved NO purification ratio even in a low-temperature region of 400° C. or less, especially 300° C. or less, compared with the exhaust gas purification catalyst of Comparative Example 2, in which only Co was supported. This is believed to be due to the fact that oxidation of cobalt is suppressed by coexistence of gold and cobalt at the nano-level in the same metal particle, as shown in FIGS. 6 and 7, etc.

Similarly, the exhaust gas purification catalysts of Example 1 to 3 were able to achieve a very high NOx reducing ability at all of the temperatures, compared with the exhaust gas purification catalyst of Comparative Example 1 i which only Au was supported, the exhaust gas purification catalyst of Comparative Example 3 in which an Au-supported catalyst and a Co-supported catalyst were physically mixed, and the exhaust gas purification catalyst of Comparative Example 4 in which Au and Co were supported by the conventional co-impregnation method. For example, the exhaust gas purification catalyst of Example 2 achieved an NO purification ratio of greater than 70% even in a low-temperature region of 300 to 400° C., whereas the exhaust gas purification catalysts of Comparative Examples 1 to 4 showed only the NO purification ratio of less than 20% even at a high temperature of 600° C. In particular, although the exhaust gas purification catalysts of Comparative Examples 3 and 4 comprises both Au and Co elements as the catalyst components as in the exhaust gas purification catalysts of Examples 1 to 3, the exhaust gas purification catalysts of Comparative Examples 3 and 4 showed a very low NOx reducing ability. This is believed to be due to the fact that since gold and cobalt do not coexist at the nano-level in the same metal particle in the exhaust gas purification catalysts of Comparative Examples 3 and 4, it is not possible to obtain the oxidation suppressing effect of cobalt due to gold.

[Analysis of Catalyst After Activity Evaluation]

Figure 12:
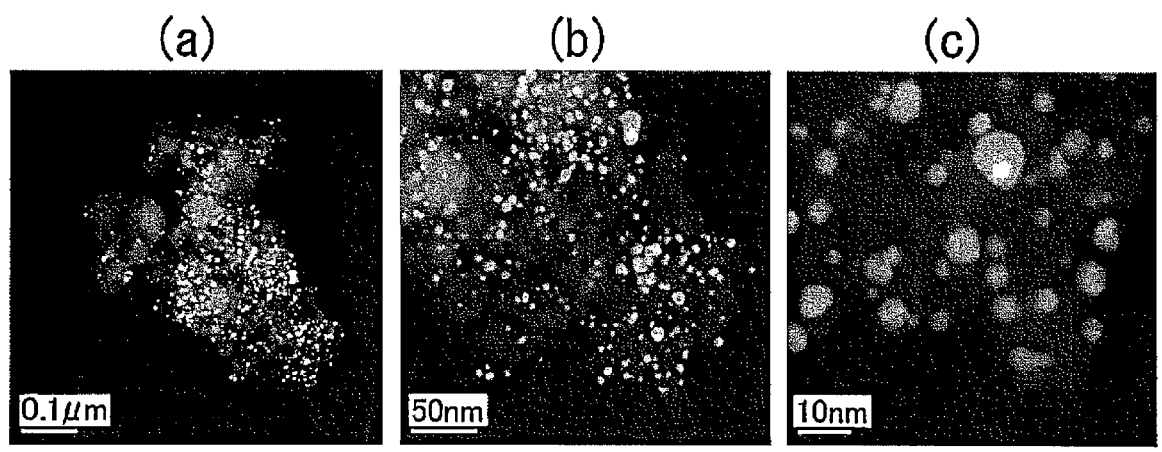
FIG. 12(a) shows a photograph of the exhaust gas purification catalyst of Example 2 taken by STEM after the activity evaluation, and FIGS. 12(b) and (c) show enlarged photographs thereof.
Figure 13:
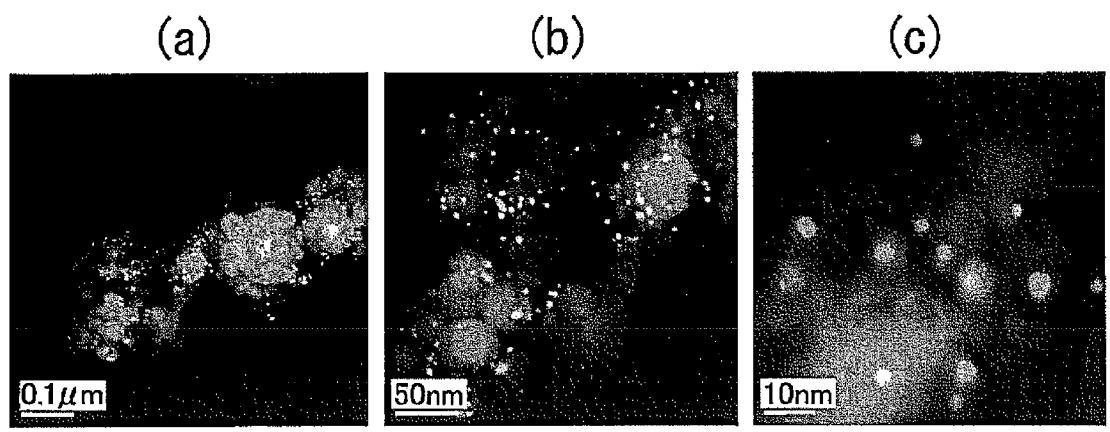
FIG. 13(a) shows a photograph of the exhaust gas purification catalyst of Example 3 taken by STEM after the activity evaluation, and FIGS. 13(b) and (c) show enlarged photographs thereof.
Figure 14:
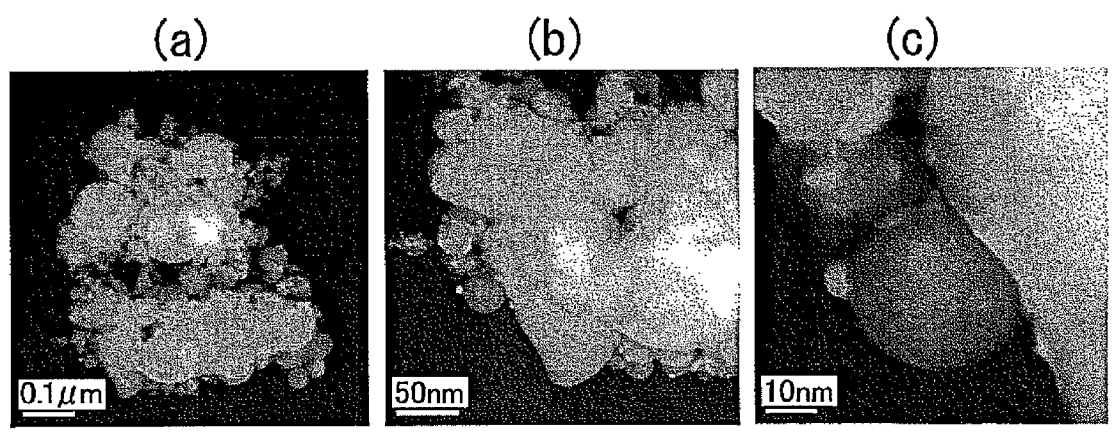
FIG. 14(a) shows a photograph of the exhaust gas purification catalyst of Comparative Example 2 taken by STEM after the activity evaluation, and FIGS. 14(b) and (c) show enlarged photographs thereof.

Next, the exhaust gas purification catalysts of Examples 2 and 3 and Comparative Example 2 after the above activity evaluation were analyzed by STEM. FIGS. 12 to 14 show the results thereof. The procedure of analysis by STEM is as described above.

FIGS. 12 to 14(a) show photographs of the exhaust gas purification catalysts of Examples 2 and 3 and Comparative Example 2 taken by STEM after the activity evaluation, and FIGS. 12 to 14(b) and (c) show enlarged photographs thereof. Referring to FIGS. 12 and 13, it can be confirmed that in Au—Co/$SiO_2$ (average Au content: 25 atomic %) of Example 2 and Au—Co/$SiO_2$ (average Au content: 10 atomic %) of Example 3, metal particles having an average particle size of apparently 10 nm or less are present on the silica support. Furthermore, many metal particles had a particle size of 5 nm or less. Therefore, a notable change was not observed in the particle size of the metal particles between before and after the activity evaluation. In addition, referring to FIG. 13(c), in Au—Co/$SiO_2$ (average Au content: 10 atomic %) of Example 3, it was suggested from the contrast in the STEM image regarding the metal particles that the metal particles are still present as a core-shell structure even after the activity evaluation. On the other hand, referring to FIG. 14, in Co/SiO$_2$ of Comparative Example 2 in which only Co was supported, a notable change was also not observed in the particle size of the metal particles between before and after the activity evaluation.

[Analysis of Catalyst by X-Ray Diffraction after Activity Evaluation]

Figure 15:
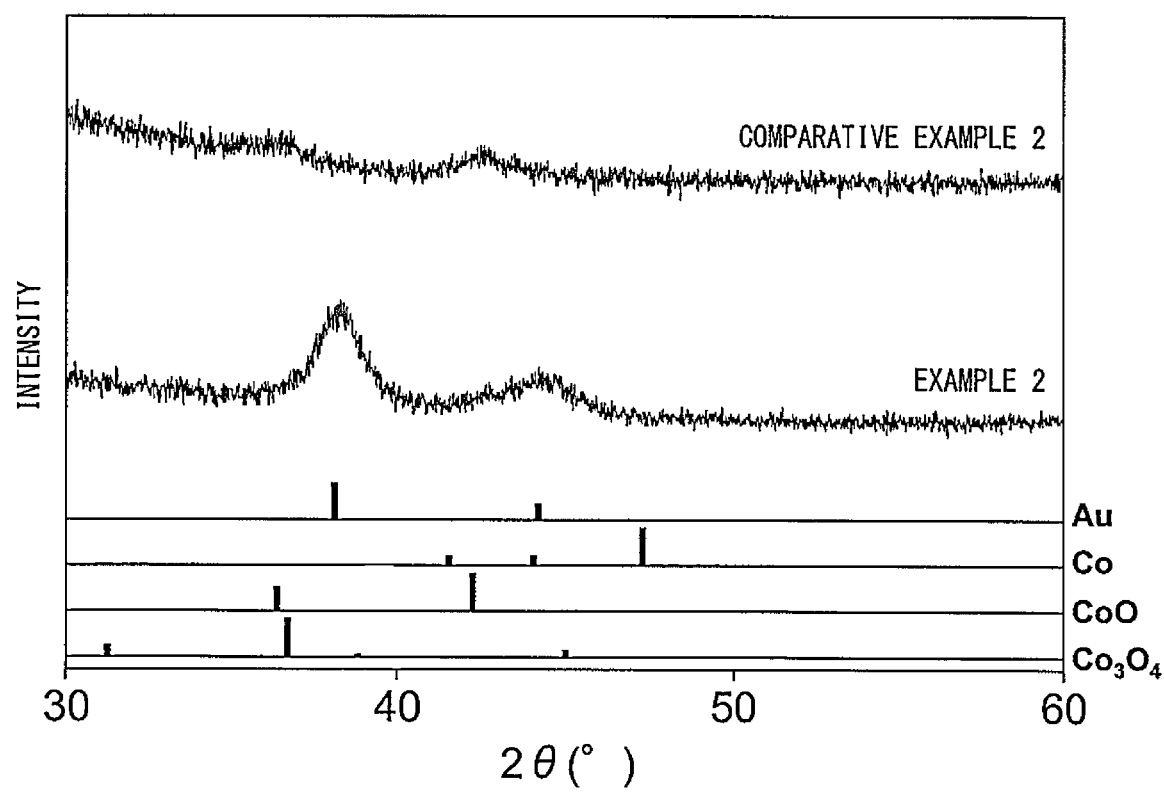
FIG. 15 is a view showing the X-ray diffraction patterns on the exhaust gas purification catalysts of Example 2 and Comparative Example 2 after the activity evaluation.

Next, the exhaust gas purification catalysts of Example 2 and Comparative Example 2 after the activity evaluation were measured by X-ray diffraction (XRD). FIG. 15 shows the results thereof. Specific conditions for measurement are as described above.

FIG. 15 is a view showing the X-ray diffraction patterns on the exhaust gas purification catalysts of Example 2 and Comparative Example 2 after the activity evaluation. FIG. 15 shows literature values of diffraction peaks for Au, Co, CoO and Co$_3$O$_4$ for reference. Referring to FIG. 15, in Co/SiO$_2$ of Comparative Example 2 in which only Co was supported, a broad diffraction peak assigned to CoO was detected near 2θ=42 to 43°. On the other hand, in Au—Co/SiO$_2$ (average Au content: 25 atomic %) of Example 2, similarly to FIG. 9, only a diffraction peak derived from fcc structure was detected, and a diffraction peak assigned to a cobalt oxide such as CoO and Co$_3$O$_4$ was not detected at all. From the analysis by STEM-EDX shown in FIGS. 6 to 8, etc., and the analysis of catalyst by X-ray diffraction before and after the activity evaluation shown in FIGS. 9 and 15 as well as the results of NO purification ratio on the exhaust gas purification catalysts of Examples 1 to 3 and Comparative Examples 1 to 4 shown in FIGS. 10 and 11, it is believed that oxidation of cobalt was able to be suppressed by coexistence of gold and cobalt at the nano-level in the same metal particle, and therefore the NOx reduction activity of cobalt was able to be enhanced.

The invention claimed is:

1. An exhaust gas purification catalyst, comprising a catalyst support and a plurality of bimetallic particles supported thereon, wherein said bimetallic particles consist of gold and cobalt and have an average particle size of greater than 0 nm but 100 nm or less.

2. The exhaust gas purification catalyst as claimed in claim 1, wherein when said exhaust gas purification catalyst is analyzed using a scanning transmission electron microscope equipped with an energy dispersive X-ray analyzer (STEM-EDX) under condition in which the spot size of an electron beam is 1 nm or less, both gold and cobalt elements are detected at a majority of measurement points for randomly selected 5 or more metal particles.

3. The exhaust gas purification catalyst as claimed in claim 2, wherein when said exhaust gas purification catalyst is analyzed using a scanning transmission electron microscope equipped with an energy dispersive X-ray analyzer (STEM-EDX) under condition in which the spot size of an electron beam is 1 nm or less, both gold and cobalt elements are detected at 70% or more of measurement points for randomly selected 10 or more metal particles.

4. The exhaust gas purification catalyst as claimed in claim 1, wherein said bimetallic particles have an average particle size of greater than 0 nm but 20 nm or less.

5. The exhaust gas purification catalyst as claimed in claim 4, wherein said bimetallic particles have an average particle size of greater than 0 nm but 10 nm or less.

6. The exhaust gas purification catalyst as claimed in claim 1, wherein said bimetallic particles have an average gold content of greater than 0 atomic % but 70 atomic % or less.

7. The exhaust gas purification catalyst as claimed in claim 6, wherein said bimetallic particles have an average gold content of 5 atomic % or more but 50 atomic % or less.

8. The exhaust gas purification catalyst as claimed in claim 7, wherein said bimetallic particles have an average gold content of 10 atomic % or more but 25 atomic % or less.

9. A method for producing an exhaust gas purification catalyst comprising a catalyst support and a plurality of bimetallic particles supported thereon wherein said bimetallic particles consist of gold and cobalt and have an average particle size of greater than 0 nm but 100 nm or less, wherein said method comprises:

heating a mixed solution containing a gold salt, a cobalt salt, a solvent and an inorganic reducing agent to a temperature sufficient to reduce gold and cobalt, thereby producing bimetallic particles consisting of gold and cobalt, and supporting the produced bimetallic particles on the catalyst support.

10. The method as claimed in claim 9, wherein when said exhaust gas purification catalyst is analyzed using a scanning transmission electron microscope equipped with an energy dispersive X-ray analyzer (STEM-EDX) under condition in which the spot size of an electron beam is 1 nm or less, both gold and cobalt elements are detected at a majority of measurement points for randomly selected 5 or more metal particles.

11. The method as claimed in claim 10, wherein when said exhaust gas purification catalyst is analyzed using a scanning transmission electron microscope equipped with an energy dispersive X-ray analyzer (STEM-EDX) under condition in which the spot size of an electron beam is 1 nm or less, both gold and cobalt elements are detected at 70% or more of measurement points for randomly selected 10 or more metal particles.

12. The method as claimed in claim 9, wherein said bimetallic particles have an average particle size of greater than 0 nm but 20 nm or less.

13. The method as claimed in claim 12, wherein said bimetallic particles have an average particle size of greater than 0 nm but 10 nm or less.

14. The method as claimed in claim 9, wherein said heating step is performed at a temperature of 90° C. or more but 250° C. or less.

15. The method as claimed in claim 14, wherein said heating step is performed at a temperature of greater than 100° C. but 200° C. or less.

16. The method as claimed in claim 9, wherein said solvent is selected from the group consisting of tetraethylene glycol, ethylene glycol, n-propyl alcohol, n-butyl alcohol, sec-butyl alcohol, isobutyl alcohol, glycerin, propylene glycol, isoamyl alcohol, n-amyl alcohol, allyl alcohol, 2-ethoxy alcohol, 1,2-hexadecanediol, dimethylformamide, and combinations thereof.

17. The method as claimed in claim 9, wherein said inorganic reducing agent is selected from the group consisting of sodium borohydride, ammonia borane, hydrazine, and combinations thereof.

18. The method as claimed in claim 17, wherein said inorganic reducing agent is sodium borohydride.

19. The method as claimed in claim 9, wherein said mixed solution further contains a protecting agent.

20. The method as claimed in claim 9, further comprising a reduction step after said supporting step.

* * * * *